May 22, 1923.

C. I. HALL

DEMAND METER

Filed Oct. 6, 1919

1,456,104

2 Sheets-Sheet 1

Inventor:
Chester I. Hall,
by *Albert G. Davis*
His Attorney.

May 22, 1923.

C. I. HALL

DEMAND METER

Filed Oct. 6, 1919

1,456,104

2 Sheets-Sheet 2

Inventor:
Chester I. Hall,
by *Albert G. Davis*
His Attorney

Patented May 22, 1923.

1,456,104

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

DEMAND METER.

Application filed October 6, 1919. Serial No. 328,732.

*To all whom it may concern:*

Be it known that I, CHESTER I. HALL, a citizen of the United States, residing at Fort Wayne, in the county of Allen, State of Indiana, have invented certain new and useful Improvements in Demand Meters, of which the following is a specification.

This invention relates to a demand meter and more particularly to the kind in which a maximum indication is used for the determination of the rate to be charged to the customer. In this device there is supplied a pointer which cooperates with a stationary scale to show what has been the maximum demand in kw. hours or in watthours in any interval, such for example, as 15 or 30 minutes.

More particularly my invention relates to an improvement in the meter shown in a patent granted to me June 4, 1912, No. 1,028,715. The meter shown in this patent makes use of a pawl and ratchet connection between the meter disc armature gearing and the operating mechanism of the driver for the maximum indicator pointer. To reset the driver for the indicator pointer use is made of a solenoid, the circuit of which is made at equal intervals. My present improvement consists in making this arrangement more compact by obviating the necessity of a solenoid for performing the resetting function. Instead of the arrangement shown in the patent referred to above I make use of a purely mechanical means for resetting the pointer.

The object of my invention, therefore, is to provide an extremely compact arrangement for performing the function stated above and also to provide a register that may be readily installed on existing standard meters.

The features of novelty that I consider new will be pointed out more particularly in the specification and in the claims attached thereto.

Figure 1:
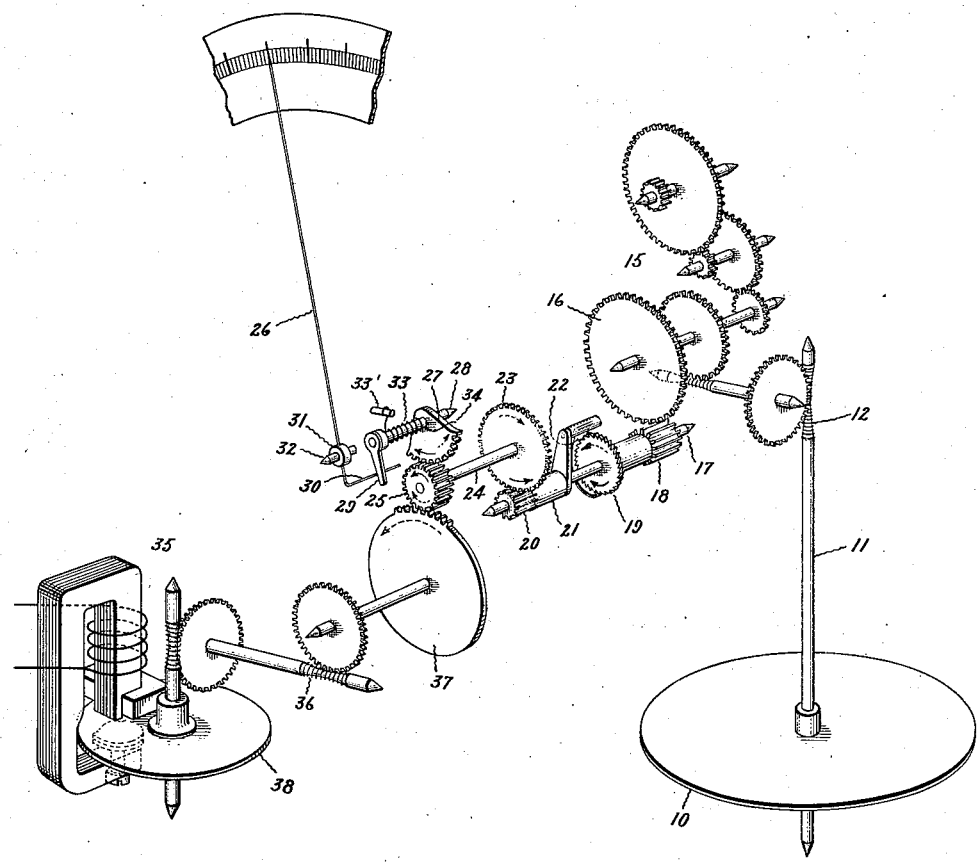
Figure 2:
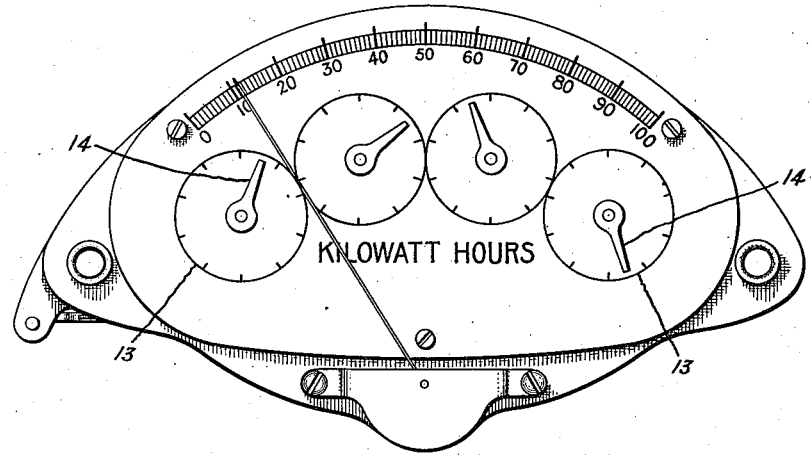
Figure 3:
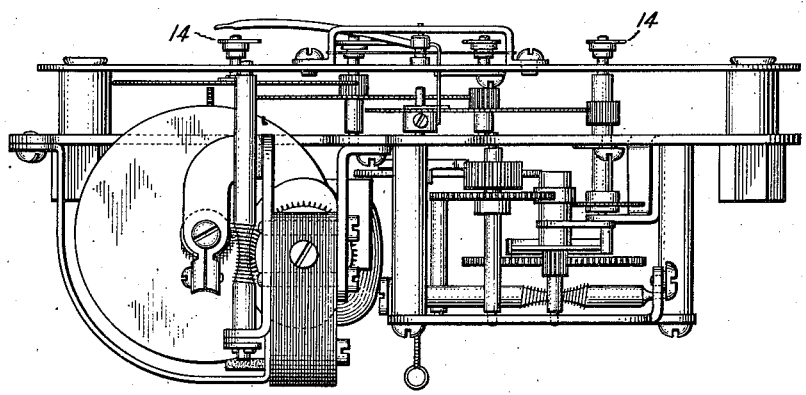

In the drawings, Fig. 1 is a distorted perspective view of the meter elements and the maximum indicator; Fig. 2 is a front view of the register and Fig. 3 is a view of the register taken from the bottom of Fig. 2 showing the compact mechanical arrangement possible with my improvement.

Referring now more in detail to the drawings in which like reference numerals refer to like parts throughout, the meter armature 10 in this case is shown as a disc of conducting material, such as copper or aluminum, and is mounted on the shaft 11 so as to be rotatable in response to the energization of the meter coils, not shown. The shaft 11 carries at its upper end a worm 12 which serves to set in motion a train of gears 15 connected to the conventional pointers for registering the amount of energy used. The dials are indicated at 13 in Fig. 2 and the pointers operated by said gear train are shown at 14. The particular details of the gear train and the pointers operated thereby are old and well known and therefore, I shall not describe them at any greater length.

Mechanically driven from the shaft 11 in any appropriate manner is the gear wheel 16. This gear wheel rotates, as can readily be seen from an inspection of Fig. 1, in accordance with the rotation of the meter disc armature 10. The gear 16 is operatively engaged with a pinion 18 which in turn is mechanically connected with the ratchet wheel 19. The pinion 18 and ratchet wheel 19 are rotatably supported on the shaft 17, held in position by any suitable means. Also rotatably supported upon said shaft is the pinion 20 and pawl support 21. The pawl support 21 carries a pawl 22 which is in operative engagement with the teeth of the ratchet wheel 19. The pawl 22 serves to prevent movement of pinion 20 and 21 in the direction of the solid arrow on ratchet wheel 19 except when said ratchet wheel itself rotates in that direction. The solid arrow indicates the forward movement of the meter. As thus far described it is evident that the pinion 20 can rotate in this direction only as the ratchet wheel 19 rotates.

The pinion 20 engages with a gear wheel 23 carried by a shaft 24 rigidly connected thereto. At the opposite end of the shaft there is provided a pinion 25. This pinion engages the mechanism that moves the maximum indicator 26. One means for performing this function is shown by the segmental gear 27 meshing with the pinion 25 and the spring 33. The solid arrows indicate the direction in which the gears 25 and 27 move for allowing the maximum indicator 26 to move in a forward direction. The segmental gear 27 is rigidly fastened to a shaft 28 which in turn carries a driver 29. Said driver consists of a slender arm adapted to engage a driving dog 30 of the indicator 26. Said dog is rigidly connected to the small bushing 31 mounted on the shaft 32. Said bushing also serves as a suitable support for the indicator 26, as shown clearly in Fig. 1.

In order to relieve the meter armature 10 of the work of driving the indicator pointer, the force actually needed for this function is supplied by a long helical spring 33, wound upon the shaft 28. One end of this spring is held by a stationary post 33'. The free end 34 is formed so as to engage the gear segment 27. The spring 33 is so arranged that it tends to rotate the gear segment in the direction of the solid arrow but is ineffective to perform this function except as the ratchet 19 rotates in response to the movement of the armature 10.

In order to reset the driver 29 and segmental gear 27 to their initial position at equal intervals of time, use is made of a constant speed mechanism 35, shown as a single-phase constant speed motor, mechanically connected through the gearing 36 with a mutilated gear 37. The direction of rotation of the armature 38 of said constant speed device is such as to cause the mutilated gear 37 to rotate in the direction of the dotted arrow. The mutilated gear 37 makes one complete revolution in a predetermined interval of time, say 15 or 30 minutes, in which the maximum demand is to be indicated. The mutilated gear, 37 is ineffective for the major portion of its revolution since no teeth thereon are in operative relation with the pinion 25. When, however, the teeth on such mutilated gear engage with the teeth of pinion 25 it rotates the same in a direction indicated by the dotted arrow, which direction is the reverse to that necessary for driving the segmental gear 27 in a forward direction. The segmental gear 27 is thus rotated in a reverse direction as indicated by the dotted arrow. The reverse movement of pinion 25 is transmitted by gear 23 and pinion 20 to the pawl 22. The pawl, in response to this movement, slides over the teeth of the ratchet wheel 18 in a direction reverse to the forward direction of rotation of the ratchet 19, as shown by the dotted arrow thereon. When the teeth on the mutilated gear 37 are again disengaged from the teeth of pinion 25 the driver 29 and segmental gear 27 have been reset to their starting position and the meter may now serve to allow the forward rotation of these parts. It is to be noted that the resetting operation is performed entirely mechanically and also serves to rewind the spring 33. The resetting operation itself occupies a very short time. The indicator 26 is so mounted that it may be readily moved in a forward direction by the driver 29, when said driver engages the driving dog 30 and is held in any position to which it is driven by friction. This feature is that commonly used for devices of this character, and need not be further described.

The operation and use of my device is now apparent from the foregoing description. The indicator 26 is engaged by the driver 29 only when the demand exceeds any previous demand, subsequent to the resetting of the indicator 26. This resetting is usually done by hand once a month when the meter is read. The elimination in my device of the solenoid operated resetting means enables the structure to be encompassed in a relatively small space. Furthermore the device is reliable in operation and not likely to require repairs.

While I have shown in the accompanying drawings, the preferred embodiment of my device my invention is not limited thereto and I aim in the appended claims to embrace all modifications falling fairly within the scope of my invention.

What I claim as new and desire to secure by Letters Patent of the United States, is:

1. A demand meter of the type wherein an indicator is advanced to the maximum position of a periodically reset driving means and wherein said driving means is advanced in accordance with the rotation of a meter armature, characterized by the provision of resetting mechanism consisting of a mutilated gear in driving connection with said driving means and other means for rotating said gear at a constant speed.

2. In a demand meter, a maximum indicator, a driver for said indicator, a shaft for said driver, a gear fixed on said shaft, a spring urging said gear in a direction to move the indicator driver in a forward direction, a meter armature, means for permitting forward movement of said driver only as said armature rotates, a mutilated gear for periodically returning the driver and its gear to an initial position, and a constant speed mechanism driving said mutilated gear.

I witness whereof, I have hereunto set my hand this 29 day of September, 1919.

CHESTER I. HALL.